United States Patent
Chhabra et al.

(10) Patent No.: US 11,036,636 B2
(45) Date of Patent: Jun. 15, 2021

(54) PROVIDING IMPROVED EFFICIENCY FOR METADATA USAGES

(71) Applicant: Intel Corporation, Santa Clara, CA (US)

(72) Inventors: Siddhartha Chhabra, Portland, OR (US); David M. Durham, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 68 days.

(21) Appl. No.: 16/457,499

(22) Filed: Jun. 28, 2019

(65) Prior Publication Data

US 2019/0324913 A1    Oct. 24, 2019

(51) Int. Cl.
*G11C 29/00* (2006.01)
*G06F 12/0846* (2016.01)
*G06F 11/10* (2006.01)
*G11C 29/52* (2006.01)

(52) U.S. Cl.
CPC ...... *G06F 12/0848* (2013.01); *G06F 11/1068* (2013.01); *G11C 29/52* (2013.01); *G06F 2212/1041* (2013.01); *G06F 2212/608* (2013.01)

(58) Field of Classification Search
None
See application file for complete search history.

(56) References Cited

U.S. PATENT DOCUMENTS

| | | | |
|---|---|---|---|
| 7,757,153 B2 | 7/2010 | Hwang et al. | |
| 8,127,205 B2 | 2/2012 | Hirano et al. | |
| 9,195,551 B2 | 11/2015 | Das et al. | |
| 10,733,048 B1* | 8/2020 | Avron | G11C 29/42 |
| 2010/0146368 A1 | 6/2010 | Chishti et al. | |
| 2011/0289380 A1 | 11/2011 | Wilkerson et al. | |

(Continued)

FOREIGN PATENT DOCUMENTS

| | | |
|---|---|---|
| GB | 2514970 A | 12/2014 |
| WO | 2013147794 A1 | 10/2013 |

OTHER PUBLICATIONS

De Zylva, Ash; "Windows 10 Device Guard and Credential Guard Demystified," available at https://blogs.technet.microsoft.com/ash/2016/03/02/windows-10-device-guard-and-credential-guard-demystified/; Mar. 2, 2016; 9 pages.

(Continued)

*Primary Examiner* — Guerrier Merant
(74) *Attorney, Agent, or Firm* — Alliance IP, LLC

(57) ABSTRACT

Technologies are provided in embodiments for improving efficiency of metadata usage by memory protection checks. One example method includes detecting a read request for data in a memory, initiating a first access to the memory for a data cache line containing the data, and initiating a second access to the memory for a metadata cache line mapped to the data cache line, where the metadata cache line contains two or more metadata items for two or more memory protection checks to be performed based on the data cache line. The method may further include performing the two or more memory protection checks using, respectively, the two or more metadata items from the metadata cache line. In more specific embodiments, the two or more memory protection checks are performed substantially in parallel.

21 Claims, 10 Drawing Sheets

(56) References Cited

U.S. PATENT DOCUMENTS

| | | |
|---|---|---|
| 2017/0091119 A1 | 3/2017 | Chhabra et al. |
| 2019/0042362 A1* | 2/2019 | Bolotov ............. H03M 13/1102 |
| 2019/0042476 A1 | 2/2019 | Chhabra et al. |
| 2019/0043600 A1* | 2/2019 | Saileshwar ......... G06F 11/1048 |
| 2020/0104208 A1* | 4/2020 | Heo ...................... G06F 3/0679 |

OTHER PUBLICATIONS

Intel; "Intel® Architecture Memory Encryption Technologies Specification," Ref: #336907-002US, Revision 1.2; https://software.intel.com/sites/default/files/managed/a5/16/Multi-Key-Total-Memory-Encryption-Spec.pdf; Apr. 2019; 30 pages.

Kelsey, John, et al.; "SHA-3 Derived Functions: cSHAKE, KMAC, TupleHash and ParallelHash," National Institute of Standards and Technology, Special Publication 800-185; available at https://nvlpubs.nist.gov/nistpubs/SpecialPublications/NIST.SP.800-185.pdf; Dec. 2016; 32 pages.

Kim, Jungrae, et al.; "Frugal ECC: Efficient and Versatile Memory Error Protection through Fine-Grained compression," Supercomputing Conference; available at https://lph.ece.utexas.edu/merez/uploads/MattanErez/sc15_frugal.pdf; Austin, Texas; Nov. 15, 2015; 12 pages.

PCT International Preliminary Report on Patentability issued in International Patent Application No. PCT/US2012/031216, dated Oct. 1, 2014; 4 pages.

PCT International Search Report and Written Opinion issued in International Patent Application No. PCT/US2012/031216, dated Nov. 29, 2012; 6 pages.

EPO; Extended European Search Report issued in EP Patent Application No. 20163526.5, dated Nov. 10, 2020; 9 pages.

Seshadri, Vivek, et al.; "The Dirty Block Index," Computer Architecture, IEEE; New Jersey; Jun. 14, 2014; 12 pages.

* cited by examiner

US 11,036,636 B2

PROVIDING IMPROVED EFFICIENCY FOR METADATA USAGES

TECHNICAL FIELD

This disclosure relates in general to data processing, and more particularly, to providing improved efficiency for metadata usages.

BACKGROUND

Protecting data in memory and performance optimization have become increasingly important in today's society. Protecting data in computer systems is often addressed using multiple memory protection checks. Examples of common memory protection checks include memory integrity verification, error detection and correction using error correcting codes (ECCs), and memory tagging validation. Each of these memory protection checks involves metadata that is to be stored in memory and accessed as needed to perform the various memory protection checks. In addition, performance optimizations, such as supporting cache coherence, also rely on metadata that is stored in memory. Unfortunately, as the need for additional memory protection checks and performance optimizations grows, the memory required to implement those checks and optimizations, along with the processing overhead can be too burdensome to be implemented in some computer systems. Accordingly, these computer systems may forgo additional needed memory protection checks and optimizations to avoid the drawbacks of implementing them.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EMBODIMENTS

Figure 1:
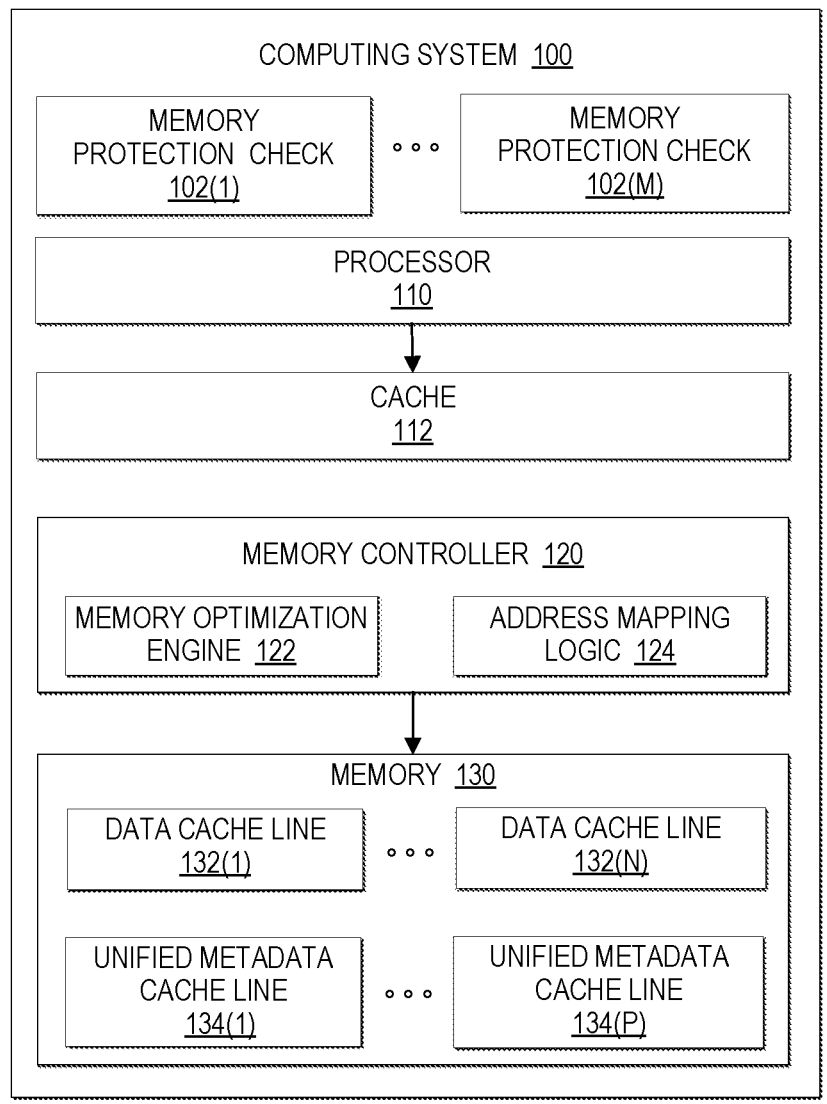
FIG. 1 is a simplified block diagram of a computing system for providing improved efficiency for metadata usage in memory protection checks according to an embodiment of the present disclosure.

The present disclosure provides various possible embodiments, or examples, of systems, methods, architectures, machine readable media, and apparatuses for providing improved efficiency for metadata usage in memory protection checks. The disclosure, for ease of understanding, is described in the context of memory protection checks such as memory integrity verification, error detection and correction using error correcting codes (ECCs), and memory tagging validation, and performance optimizations such as supporting cache coherence. However, the disclosure is not limited to these memory protection checks and performance optimizations and may be practiced with any number or combination of memory protection checks, performance optimizations, or other usages for which metadata is stored.

For purposes of illustrating embodiments for a system that provides improved efficiency for metadata usage in memory protection checks, it is important to understand the activities that may be occurring in a system in which memory protection checks store metadata in memory. The following introductory information provides context for understanding embodiments disclosed herein.

As computer security risks increase across all types of computing systems, storing metadata in the memory of a computing system is increasingly needed for various usages. Example usages include, but are not necessarily limited to, memory protection checks such as memory integrity verification, memory tagging validation, and error detection and correction using error correcting codes (ECC). Additionally, metadata stored in memory is also increasingly being used for performance optimizations. For example, metadata items containing cache coherence information can be used by hardware as a performance hint to identify the location of a cache line and thus, to minimize the number of snoops to be sent out for maintaining coherence between the caches. This is particularly useful in a system with multiple sockets where cache lines may be present in different sockets.

Error detection and correction involves storing an error correction code (ECC) in memory and using the same code to detect and possibly correct errors before passing the data back to the requestor. An ECC memory is typically used in server platforms and provides additional bits for storing the error correcting codes. Certain systems, such as server systems running customer loads, require detection and correction of any error, including soft errors such as a bit flip, even if such errors would not necessarily cause a system crash. For example, a bit flip may occur at high altitudes when radiation hits the memory. With ECC memory, when a read request is performed, a cache line containing the requested data is retrieved in addition to the error correcting codes, which are generated when the data is written to memory. Without ECC memories, error correcting codes (ECCs) can be stored as metadata items in memory that is a non-ECC type of memory. In this scenario, the ECC feature can be implemented using sequestered memory, where the ECC is stored on a per-cache line basis and fetched along with the memory access.

Memory integrity verification is used to ensure that data stored in memory has not been inadvertently or maliciously altered. In one example of a memory integrity technique, a metadata item includes an integrity code value (ICV) such as a Message Authentication code (MAC) and is stored per-cache line in memory. Thus, each cache line in memory can be associated with an ICV. During a write operation, once the data is encrypted into ciphertext, an ICV is generated based on the ciphertext and then stored in memory. During a read operation, the ICV is fetched along with the data cache line associated with the ICV and the ICV is verified. If there is a mismatch, it indicates that the data was modified while resident in memory or when moving over the memory bus. In this scenario, the data cache line can be flagged as a security exception.

Memory tagging involves applying a per-cache line tag to data stored in memory for memory safety. When memory is allocated, a first tag is applied to the allocated memory block (e.g., data cache line) and the pointer to the memory block. When the memory block is freed, a second tag is applied to the memory block. If the pointer tries to access the memory block again, memory tagging validation can detect a mismatch between the tags and identify a 'use-after-free' error. The tags applied to a memory block (or data cache line) can be stored in memory as a metadata item.

For some current systems, other memory protection checks (e.g., memory integrity, memory tagging) may rely on using ECC memories or sequestering memory to store their metadata. With the ECC memories solution, some bits in the ECC metadata are taken away for storing the per-cache line MAC and/or memory tag. This approach, however, relies on ECC memories to provide these capabilities. Because client systems and Internet of thing (IoT) parts do not typically use the more expensive ECC memories, this approach is generally available only to servers and platforms with customer loads. In addition, using ECC memory to store metadata for other security usages can make the ECC weaker as it takes away bits that are architected for use by ECC and other reliability, availability, and serviceability (RAS) features.

In another solution, memory is sequestered to store metadata for each of the memory protection checks. Depending on what features are enabled by a user, BIOS (Basic Input/Output System) essentially steals memory from system address space for the metadata to be stored. As an example, for a platform requiring both memory integrity and ECC capabilities, the platform firmware (or BIOS) can sequester two regions in memory at boot time, one for storing the and another one for storing the per-cache line ECC metadata. The platform firmware can provide these regions as reserved memory to the operating system in the unified extensible firmware interface (UEFI) memory map. This prevents the operating system from using these regions for other metadata or other purposes.

Using sequestered memory to store metadata on a per-use basis for memory protection checks can result in large performance overheads. Metadata that is stored in memory on a per-use basis can cause multiple memory accesses for each memory read or write, depending on the features desired. As an example, in a system requiring memory integrity and ECC, each read access can result in two additional memory accesses to fetch the corresponding MAC for integrity verification and to fetch the ECC code for error detection/correction. The multiple memory accesses can be expensive from a performance and power standpoint.

Embodiments disclosed herein can resolve the aforementioned issues (and more) associated with storing metadata in memory for various usages. In one or more embodiments, such as computing system 100 for example, memory is sequestered in a novel approach to enable multiple memory protection checks that rely on metadata in memory to be performed without having to incur the cost of multiple memory accesses. Embodiments provide a unified metadata re-organization scheme to store together all metadata associated with multiple memory protection checks for a particular cache line. Metadata for these different usages (e.g., memory integrity, ECC, memory tagging) that is generated for data in a given cache line is stored in a single metadata cache line in memory. This enables all usages to be supported with not more than one additional memory access. Furthermore, some embodiments can include integration with a security engine resident on the memory path that provides encryption/decryption capabilities for the memory. Such integration may be used to optimize performance by providing parallelization of operations for multiple usages of the metadata. Although memory integrity, ECC, and memory tagging are used herein to illustrate memory protection capabilities that can be supported in one or more embodiments, it should be noted that embodiments can easily be extended to support other metadata usages such as, but not necessarily limited to, performance optimizations.

Embodiments disclosed herein enable memory protection techniques that store metadata to be implemented in platforms that do not typically use ECC memories, without sacrificing efficiency. Thus, embodiments provide a low-cost solution for systems such as client and IoT devices to implement memory protection capabilities such as memory integrity, memory tagging, and ECC. Embodiments are also useful in server systems that use ECC memory but do not have enough bits in the ECC memory to store metadata for all usages. Embodiments enable a low performance overhead solution for these features by unifying the metadata required for these techniques instead of storing them in separate regions, and hence requiring multiple memory accesses to fetch them. One or more embodiments store all metadata using a unified metadata approach without relying on ECC memories, while ensuring no more than one additional access to memory. This can result in a three times bandwidth reduction for supporting memory integrity, tagging, and ECC. In addition, in at least some embodiments, a memory encryption/decryption security engine on the memory path can be enhanced by implementing a parallelized design for these metadata usages combined with caching to further minimize performance overheads. With the increased need for memory integrity and error correction capabilities on platforms without ECC memories (e.g., client systems, Internet of Things parts, etc.), the embodiments disclosed herein can prove critical for enabling these capabilities with minimal performance overheads on such platforms.

Turning to FIG. 1, FIG. 1 is a simplified block diagram of a computing system 100 for providing improved efficiency for metadata usage in memory protection checks. A brief discussion is now provided about some of the possible infrastructure that may be included in computing system 100. Computing system 100 can include memory protection checks 102(1)-102(M), a processor 110, one or more levels of cache 112, a memory controller 120 with a memory optimization engine 122 and address mapping logic 124, and memory 130. Memory can include blocks of data, which are illustrated as data cache lines 132(1)-132(N) and unified metadata cache lines 134(1)-134(P). In one or more embodiments, for a given data cache line, the metadata used by memory protection checks for that data cache line is stored in a single unified metadata cache line. In at least some embodiments, the metadata may be stored consecutively in the metadata cache line. The metadata used by the memory protection checks for another data cache line may be store in the same unified metadata cache line or in another unified metadata cache line.

Computing system 100 is intended to represent any type of device in which two or more memory protection checks can be implemented for protecting memory (e.g., 130) of the device. Computing systems can include, but are not limited to, servers, desktops, laptops, workstations, tablets, mobile devices, smartphones, etc. (any of which may include physical hardware or a virtual implementation on physical hardware), or any other device, component, or element capable of implementing memory protection checks (e.g., memory protection checks 102(1)-102(M)). At least some computing systems may also be inclusive of a suitable interface to a human user (e.g., display screen, etc.) and input devices (e.g., keyboard, mouse, trackball, touchscreen, etc.) to enable a human user to interact with the computing system and an interface to the compiler to provide input and to receive information for example, reports based on results of compilation activities and/or compiled code.

It should be noted that computing system 100 may include any suitable internal components to achieve improved efficiency for metadata usage in memory protection checks as outlined in this specification. Note that in one example, computing system 100 can have an internal structure (e.g., processor 110, memory 130, memory controller 120) to facilitate some of the operations described herein. Furthermore, computing system 100 can include any suitable algorithms, hardware, circuitry, software, firmware, components, modules, interfaces, or objects to facilitate the operations thereof.

Generally, processor 110 may be a single or multi-core processor comprising circuitry to process instructions that drive the computing system. Processor 110 may use one or more levels of cache 112 to access data from memory 130. Memory 130 represents main memory and/or external storage of the computing system. Main memory may be an internal physical memory such as, for example, random access memory (RAM), dynamic random access memory (DRAM), synchronous dynamic random access memory (SDRAM), static random access memory (SRAM), read-only memory (ROM), programmable ROM (PROM), erasable PROM (EPROM), electrically EPROM (EEPROM), or other types of machine-readable storage media that are capable of storing data and information.

Memory 130 can be organized in cache lines (e.g., 132(1)-132(N), 134(1)-134(P)). A cache line is the unit of data transfer between main memory 130 and cache 112. In a common example, a cache line is 64 bytes. It should be apparent, however, that the size of a cache line may vary depending on the particular architecture and implementation. In computing system 100, data cache lines 132(1)-132(N) contain data that may be accessed by processor 110, for example, using read and write operations. In at least one embodiment, unified metadata cache lines 134(1)-134(P) are sequestered from other portions of memory 130. For a given data cache line, the metadata to be used by the memory protection checks can include a separate metadata item for each memory protection check. The multiple metadata items for the data cache line may be stored consecutively in a metadata chunk in one of the unified metadata cache lines. A particular metadata cache line may contain multiple metadata chunks corresponding to multiple data cache lines. Because the metadata items for a single data cache line are stored together in a unified metadata cache line, all usages of the metadata items for the data cache line can be supported with a single additional memory access to the relevant unified metadata cache line.

In at least one embodiment, memory optimization engine 122 is provisioned on the memory path to memory 130 and is configured to store and access metadata in the unified metadata cache lines 134(1)-134(P). Address mapping logic 124 may also be provisioned on the memory path to memory 130 and is configured to locate, for a given data cache line, a metadata cache line mapped to the data cache line, a metadata chunk in the metadata cache line that contains the metadata for the memory protection checks to be performed on the data cache line, and each metadata sub-chunk within the metadata chunk that is to be used by a particular memory protection check on the data cache line. Memory controller 120 may include any suitable hardware, software, firmware, components, modules, interfaces, or objects that facilitate the operations thereof, including the operations performed by memory optimization engine 122 and address mapping logic 124.

In one example implementation, memory optimization engine 122 and address mapping logic 124 can be integrated with a security engine that performs memory encryption and decryption. For example, Intel Corporation's Multi-Key Total Memory Encryption (MKTME) provides full physical memory encryption including support for page-granular memory encryption based on different keys for each page. In at least one embodiment, memory optimization engine 122 and address mapping logic 124 can be integrated with MKTME (or any other suitable security engine enabling memory encryption/decryption) to achieve parallelization of operations based on multiple memory protection checks using respective metadata.

Figure 2:
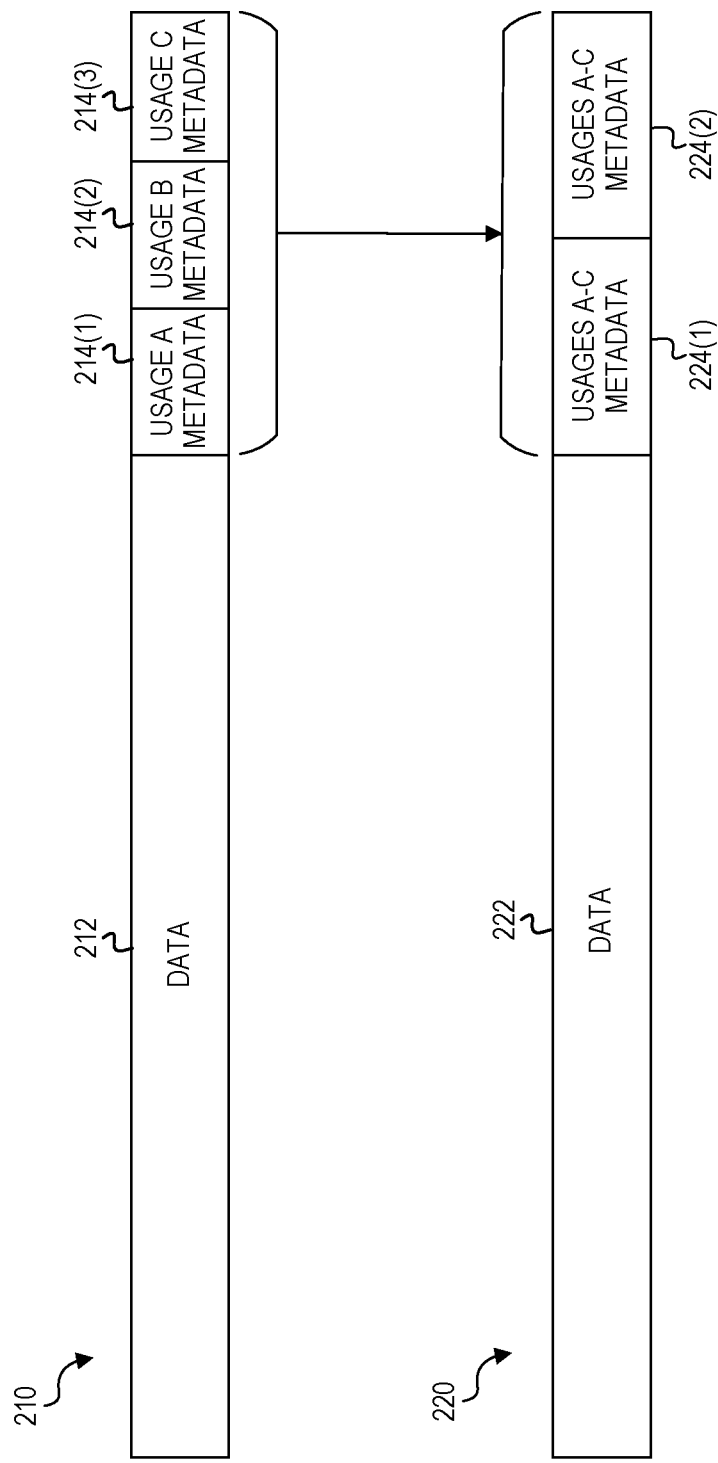
FIG. 2 is a simplified block diagram illustrating an example format for metadata stored in memory according to at least one embodiment.

FIG. 2 schematically illustrates metadata allocation in memory based on current mechanisms versus metadata allocation in memory based on one or more embodiments to improve efficiency of metadata usage in memory protection checks as disclosed herein. With current mechanisms, metadata for each usage is stored in a separate region in memory. Therefore, on a write access, hardware generates the metadata for each usage and stores it separately in memory. With memory integrity and ECC for example, this results in three writes to memory including the original data cache line write. The additional bandwidth consumption due to an extra write access can hurt performance. For a read request, the hardware fetches three separate cache lines in the worst case, which include the data cache line, the MAC cache line, and the ECC cache line. The additional bandwidth consumption due to the extra read access can hurt performance. Furthermore, read accesses are in the critical path (e.g., processor or other requestor waiting for the response), and therefore, the resulting delay in the critical path is undesirable.

In FIG. 2, a first memory area 210 shows a simplified, high-level example of metadata allocation in memory for different usages. Memory area 210 is intended to represent multiple cache lines that include data 212 and usage metadata 214(1)-214(3). Data 212 may be stored contiguously in one or more data cache lines. Usage A metadata 214(1) represents multiple instances of usage A metadata for multiple data cache lines and these instances are stored contiguously in one or more cache lines. Usage B metadata 214(2) represents multiple instances of usage B metadata for multiple data cache lines and these instances are stored contiguously in one or more cache lines. Usage C metadata 214(3) represents multiple instances of usage C metadata for multiple data cache lines and these instances are stored contiguously in one or more cache lines. The cache lines containing usage A metadata 214(1) may be different than the cache lines containing usage B metadata 214(2) and usage C metadata 214(3), and the cache lines containing usage B metadata 214(2) may be different than the cache lines containing usage C metadata. Usage metadata from different cache lines, however, may be used for memory protection checks or performance optimizations that are performed for the same data cache line. For example, usage A metadata may be stored in a first cache line and used for memory integrity verification of data contained in a second cache line. Usage B metadata may be in a third cache line and used for error code detection of errors in the data contained in the second cache line. Usage C metadata may be in a fourth cache line and used for memory tagging validation of data contained in the second cache line. In this scenario, each time the second cache line is read to obtain the data, three additional reads are initiated to obtain usage A metadata, usage B metadata, and usage C metadata in their respective cache lines.

In current mechanisms using memory allocation shown at 210, on a write access, hardware generates the metadata for each usage and stores it separately in memory. If memory integrity, ECC, and memory tagging are used in a system to protect its memory, this results in four writes to memory including the original data cache line write. The additional bandwidth consumption due to extra write access can hurt performance. For a read request, the hardware fetches four separate cache lines in the worst case, which include the data cache line (e.g., in data 212), the MAC cache line (e.g., in usage A metadata 214(1)), the ECC cache line (e.g., in usage B metadata 214(2)), and the memory tagging cache line (e.g., in usage C metadata 214(3)). The additional bandwidth consumption due to the extra read accesses can hurt performance. Furthermore, read accesses are in the critical path (e.g., a processor or other requestor is waiting for the response), and therefore, the resulting delay in the critical path can be unacceptable. Additionally, in current mechanisms, error detection and correction are typically performed prior to memory integrity verification. Using the serialized operations with multiple memory accesses for metadata can also negatively impact performance.

Embodiments disclosed herein for improving efficiency of metadata usage in memory protection checks offer unified metadata, which re-organizes the metadata in memory to allow for a low-cost, more efficient solution without reliance on ECC memories. In this embodiment, the BIOS computes the space required for each of the metadata items to be stored and allocates a single range in memory that can store all the metadata required for all usages. A second memory area 220 in FIG. 2 shows a simplified, high-level example of this unification of metadata allocation by the BIOS. Second memory area 220 is intended to represent multiple data cache lines for data 222 and a single metadata cache line for usages A-C metadata 224(1). Usages A-C metadata 224(2) may be stored in the same single metadata cache line as usages A-C metadata 224(1), or it may be stored in a different single metadata cache line. In at least one embodiment, the metadata used for all of the memory protection checks for a given data cache line is stored in a single metadata cache line of the memory. For example, usages A-C metadata 224(1) may contain usage A metadata (e.g., error detection and correction code), usage B metadata (e.g., memory integrity MAC), and usage C metadata (e.g., memory tag), which are to be used in memory protection checks for a given data cache line, and which may be stored consecutively in in a single metadata cache line. Accordingly, each time the given data cache line is read, only a single additional read may be initiated to obtain usage A metadata, usage B metadata, and usage C metadata for the given data cache line.

Figure 3:
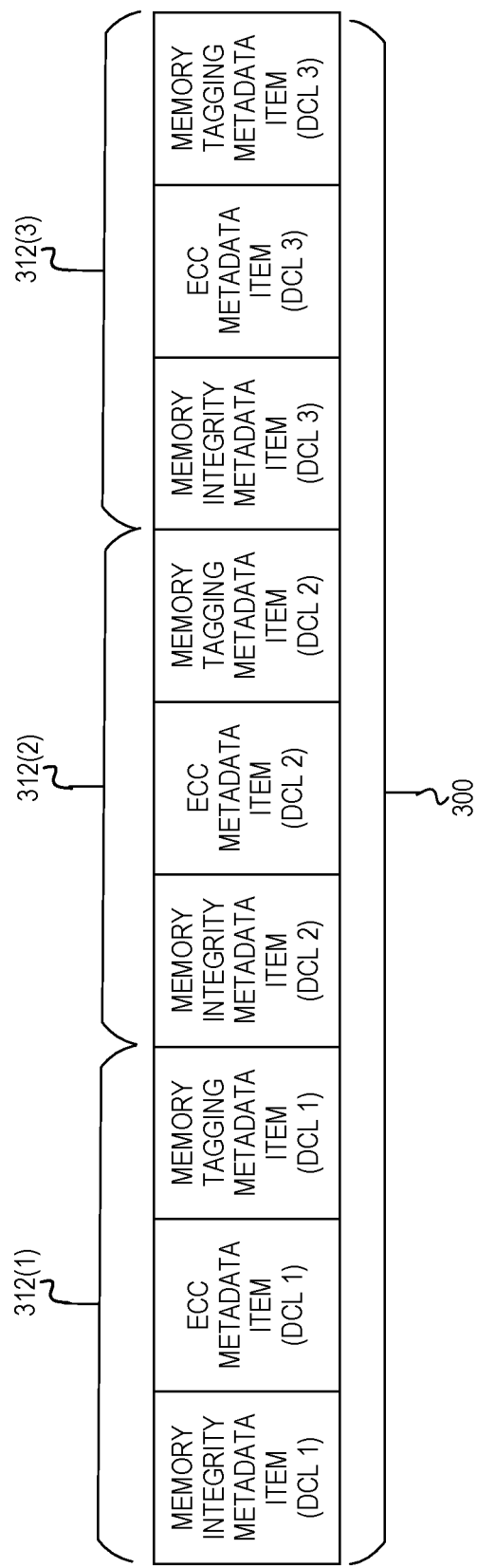
FIG. 3 is a simplified block diagram illustrating a format for allocating metadata in a cache line in one example scenario according to at least one embodiment.

FIG. 3 schematically illustrates an example structure and possible contents of a unified metadata cache line 300 in an example computer system in which the memory protection checks that are implemented include a memory integrity verification, an error detection and correction using ECCs, and a memory tagging validation. Although FIG. 3 shows only one metadata cache line, this is for illustration purposes only and it should be apparent that multiple metadata cache lines may be allocated in memory. Each metadata cache line stores a separate metadata item for each of the memory protection checks to be performed on one or more data cache lines. In this example in which memory protection checks include memory integrity, ECC, and memory tagging, metadata cache line 300 includes metadata chunks 312(1)-312(3). Each metadata chunk stores a memory integrity metadata item (e.g., MAC), an ECC metadata item (e.g., ECC bits), and a memory tagging metadata item (e.g., tags) consecutively for the same data cache line. For example, metadata chunk 312(1) stores a MAC, ECC bits, and memory tags for memory protection checks to be performed on data cache line 1 (DCL 1). Metadata chunk 312(2) stores a MAC, ECC bits, and memory tags for memory protection checks to be performed on data cache line 2 (DCL 2). Metadata chunk 312(3) stores a MAC, ECC bits, and memory tags for memory protection checks to be performed on data cache line 3 (DCL 3).

The size of the metadata chunk to be stored for a cache line determines the total number of cache lines for which metadata can be stored on a single metadata cache line. For example, the size of a metadata chunk in this example includes the combined size of a MAC, ECC bits, and memory tag for a data cache line. This metadata chunk size can be used to determine the total number of data cache lines for which metadata items can be stored on a single metadata cache line. By way of example, with a MAC size of N bytes, an ECC size of M bytes, and a memory tag size of P bytes, the total number of data cache lines for which the metadata items can be compacted on a single metadata cache line can be calculated as follows:

Size of metadata cache line (e.g., 64 bytes)/$(M+N+P)$

Efficiency is improved in a system with multiple memory protection capabilities that uses unified metadata cache lines. With unified metadata cache lines, only one additional access to memory is needed to fetch the corresponding metadata cache line. Individual read and write accesses for each sub-chunk containing metadata associated with a particular data cache line are not needed.

Figure 4:
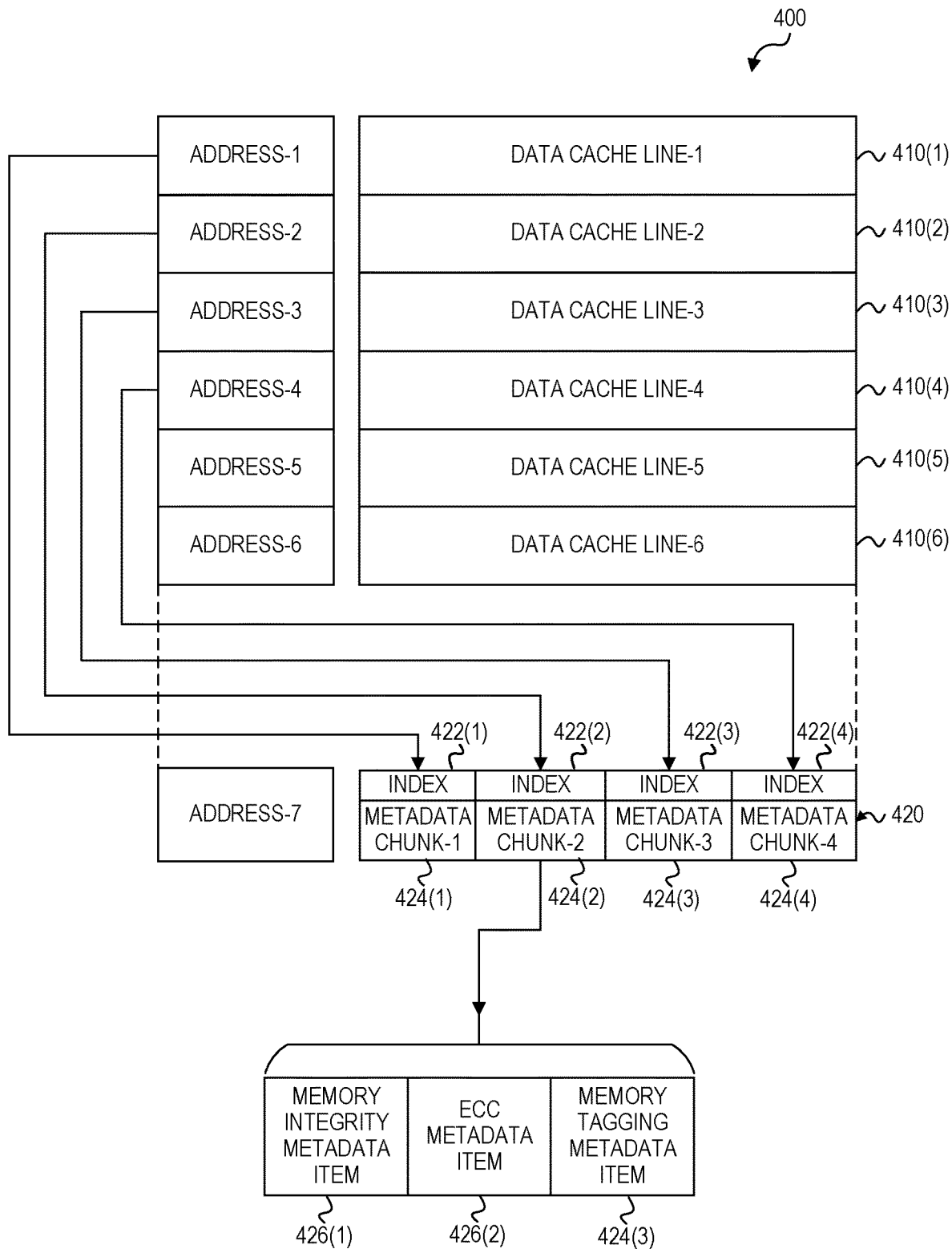
FIG. 4 is a simplified block diagram illustrating example contents of memory in a system providing improved efficiency for metadata usage in memory protection checks according to at least one embodiment.

FIG. 4 schematically illustrates an example of memory allocated with data cache lines and a metadata cache line in an example computer system in which the memory protection checks that are implemented include a memory integrity verification, an error detection and correction using ECCs, and a memory tagging validation. Generally, there is a one-to-one mapping from one or more data cache lines to a unified metadata cache line. Within the unified metadata cache line, there can be N metadata chunks for N data cache lines. Each metadata chunk can include metadata items for all of the memory protection checks implemented in the computer system and to be performed on each data cache line when that data cache line is accessed (e.g., read, written to) in memory.

In the example of FIG. 4, a memory 400 includes six data cache lines, data cache line-1 410(1) at address-1, data cache line-2 410(2) at address-2, data cache line-3 410(3) at address-3, data cache line-4 410(4) at address-4, data cache line-5 410(5) at address-5, and data cache line-6 410(6) at address-6. Memory also includes a metadata cache line 420(1) at address-7. Metadata cache line 420(1) contains four metadata chunks 424(1)-424(4) that are indexed within the metadata cache line 420(1) by respective indexes 422(1)-422(4). Each metadata chunk includes metadata items for all the memory protection checks implemented for memory 400. In this example, the memory protection checks include memory integrity, ECC, and memory tagging. Metadata chunk-1424(1) contains metadata items for data cache line-1410(1), metadata chunk-2 424(2) contains metadata items for data cache line-2 410(2), metadata chunk-3 424(3) contains metadata items for data cache line-3 410(3), and metadata chunk-4 424(4) contains metadata items for data cache line-4 410(4). Metadata items for the data cache line-5 410(5) and data cache line-6 410(6) may be contained in another metadata cache line (not shown). Metadata chunk-2 424(2) is expanded to show the metadata items (or sub-chunks) it contains as memory integrity metadata item 426(1) (e.g., MAC), ECC metadata item 426(2) (e.g., ECC bits), and memory tagging metadata item 426(3) (e.g., memory tag). The other metadata chunks can also contain metadata items (or sub-chunks) for the same memory protection checks, but with different values for the different data cache lines.

To locate metadata for a data cache line, for example upon detecting a read request or a write request, address mapping logic of the memory controller can first identify the metadata cache line that is mapped to the targeted data cache line. Address mapping logic can then use the address of the targeted data cache line to determine an index of the appropriate metadata chunk within the metadata cache line for the data cache line. For example, to identify metadata for data cache line-2 410(2), address-2 of data cache line-2 410(2) can be used to determine index 422(2) for metadata chunk-2 424(2) in metadata cache line 420. Within a metadata chunk, metadata items (or sub-chunks) contain different metadata to be used by different memory protection checks or performance optimizations. In the example of FIG. 4, metadata chunk-2 includes memory integrity metadata item 426(1), ECC metadata item 426(2), and memory tagging metadata item 426(3). The address mapping logic can choose the first metadata item within the metadata chunk for a first memory protection check, the second metadata item within the metadata chunk for the second memory protection check, and the third metadata item within the metadata chunk for the third memory protection check. In at least one embodiment, the read request is performed in parallel (or substantially in parallel) to the memory access for the associated metadata, if the metadata cache line is not already in cache.

Figure 5:
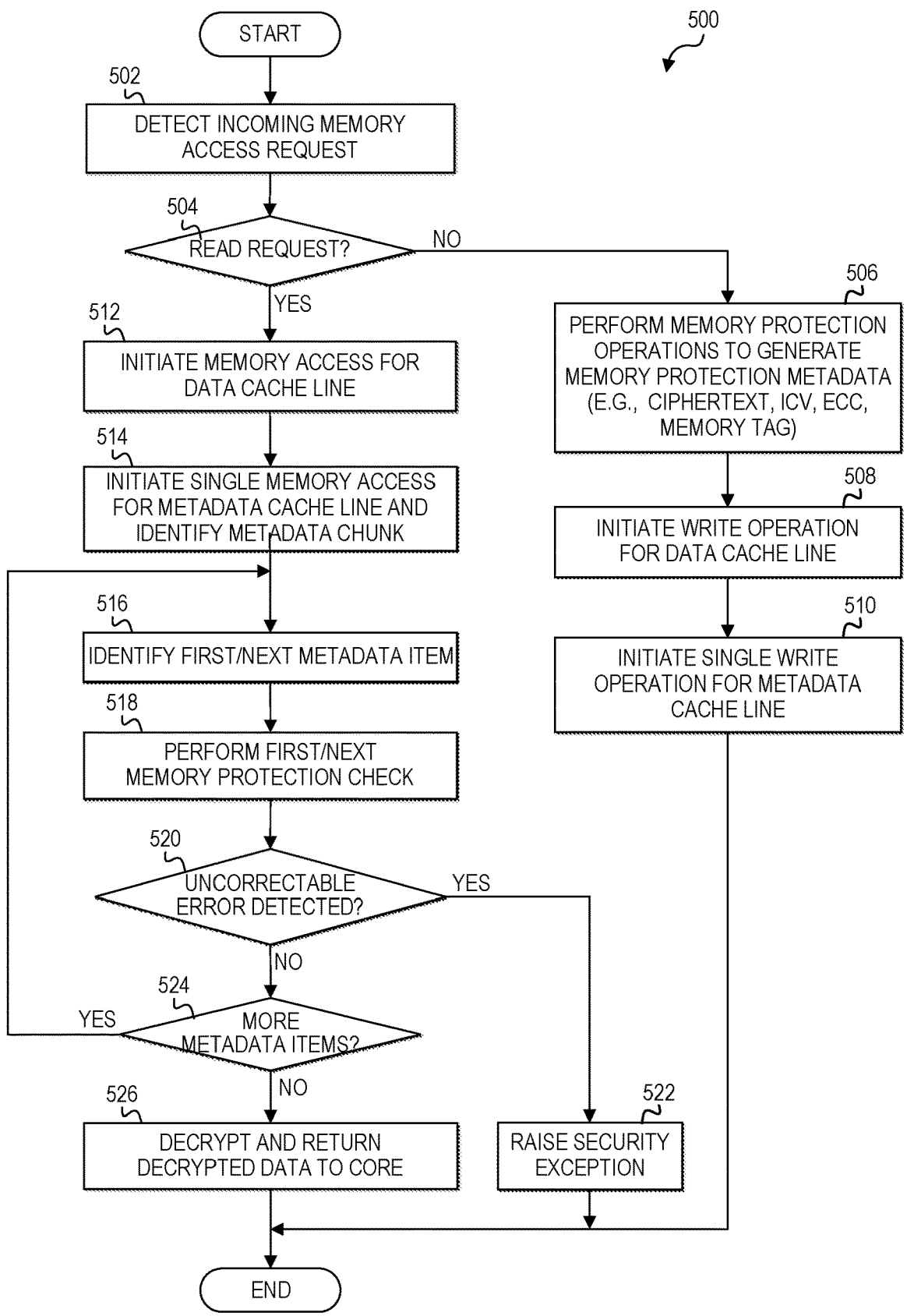
FIG. 5 is a simplified flowchart of potential operations associated with the computer system providing improved efficiency for metadata usage in memory protection checks according to at least one embodiment.

Turning to FIG. 5, a flow chart illustrates a flow 500 of possible operations for improving efficiency of metadata usage in memory protection checks, in accordance with at least one embodiment. Flow 500 is generally applicable to any combination of memory protection checks including, but not necessarily limited to, memory integrity verification, error detection and correction, and memory tagging validation. Flow 500 is also generally applicable to other metadata usages such as performance optimizations (e.g., cache coherence support). In FIG. 5, flow 500 may be associated with one or more sets of operations. A computing system (e.g., computing system 100) may comprise means such as one or more processors (e.g., 110), for performing the operations. In one example, at least some operations shown in flow 500 may be performed by memory optimization engine 122 and/or address mapping logic 124 of memory controller 120 and memory protection checks 102(1)-102(M).

At 502, an incoming memory access request is detected. At 504, a determination is made as to whether the memory access request is a read request. If the memory access request is not a read request (e.g., if it is a write request), then at 506, memory protection operations can be performed based on the memory protection checks that are implemented for the memory. For example, the memory protection operations may generate ciphertext of the data, an ICV of the ciphertext, an ECC for the data, a memory tag for the data.

Any suitable cryptographic techniques may be used to generate ciphertext from the data to be written to memory and to generate an integrity code value (ICV) such as a message authentication code (MAC). In at least one embodiment, a secure hash algorithm (e.g., SHA-3, etc.) or Merkle-Damgard algorithm (e.g., MD5, etc.) may be used to generate the ciphertext, and a MAC can be generated on the ciphertext. In one embodiment, a Keccak MAC (KMAC) algorithm can be used to generate a KMAC from the ciphertext of the data. A KMAC algorithm is a variable-length keyed hash function described in NIST Special Publication 800-185, SHA-3 Derived Functions: cSHAKE, KMAC, TupleHash and Paralle/Hash, John Kelsey, Shu-jen Chang, Ray Periner, National Institute of Standards and Technology, December 2016. In another embodiment, a nested construction may be used, such as a hash-based message authentication code (HMAC) generated from the ciphertext of the data. In yet other embodiments, a Galois/Counter Mode (GCM) mode of operation for symmetric-key cryptographic block ciphers, or a suitable variation thereof, may be used to provide integrity and confidentiality of the data. In this implementation, a ciphertext is generated from the data and a Galois message authentication code (GMAC) is generated based, at least in part, on the ciphertext.

At 508, a write operation can be initiated to write a data cache line to memory, which can include the ciphertext generated from the data. At 510, a single write operation can be initiated to write a metadata cache line to memory that contains metadata items for each of the memory protection checks implemented for the memory. In at least one embodiment, this single write operation can cause metadata items to be stored consecutively in the metadata cache line in memory for all of the memory protection checks to be performed on data in the data cache line, for example when a subsequent read operation is performed on that data. Flow may end after the metadata cache line is written to memory.

At 504, if it is determined that the memory access request is a read request, then at 512, memory access for the data cache line can be initiated. At 514, memory access is initiated for the metadata cache line that contains metadata items to be used in memory protection checks for the data cache line. Initiating a memory access for the metadata cache line includes identifying the metadata cache line to be accessed. In one example, a determination may be made as to which metadata cache line is mapped to the data cache line, because any given data cache line is mapped to only a single metadata cache line in a one-to-one mapping. It should be noted, however, that in at least one embodiment, other data cache lines may also be mapped to the same metadata cache line. Thus, a metadata cache line may be mapped to data cache lines in a one-to-many mapping.

Also at 514, a metadata chunk that is in the metadata cache line and contains metadata items for the data cache line is identified. In one example, the address of the data cache line can be used to determine an index for the metadata chunk that contains the metadata items for the data cache line.

At 516, a first metadata item in the identified metadata chunk of the metadata cache line is identified. The first metadata item contains a value (e.g., ECC bits, MAC, tag, etc.) to be used with the first memory protection check to be performed. At 518, a first memory protection check is performed for the data cache line using the value in the identified metadata item of the identified metadata chunk in the metadata cache line.

At 520, a determination is made as to whether an uncorrectable error has been detected based on the memory protection check that was performed. For example, for error code detection, an error is detected if the ECC bits are set to indicate an error, such as a bit flip, in the data. However, a bit flip may be correctable on the fly. Therefore, an ECC error may be uncorrectable if an attempt to correct the error is made but fails. In another example, for memory integrity verification, an uncorrectable error can occur if the ICV from the metadata cache line does not match an ICV generated over the data (or ciphertext) from the data cache line that is accessed. For memory tagging validation, an uncorrectable error can occur if data is accessed by a pointer having an assigned tag that does not match the tag of the data (e.g., different colors).

If an uncorrectable error is detected at 520, then at 522, a security exception can be raised. In at least one embodiment, security exception handling can be triggered and any suitable action may be taken (e.g., alert sent to user/monitor, error logged, processing halted, etc.).

At 520, if no error is detected or if an error is detected and corrected, then at 524, a determination can be made as to whether one or more metadata items are present in the metadata chunk for the data cache line. If one or more metadata items are present in the identified metadata chunk, then flow passes to 516, where the next metadata item is identified. At 518, the next memory protection check is performed using the value in the newly identified metadata item. Processing may continue as previously described.

At 524, if no more metadata items are present in the metadata chunk, then at 526, the data can be decrypted and returned to the processing core to satisfy the memory access request. It should be noted that, although flow 500 assumes that memory is encrypted when used in conjunction with memory integrity, this is not a requirement. In some implementations, data integrity may be required in a system, whereas confidentiality may not be needed. In this scenario, the data may not be encrypted in memory. Moreover, in some implementations, the memory integrity and ECC metadata may be cached to amortize the performance overheads.

Figure 6:
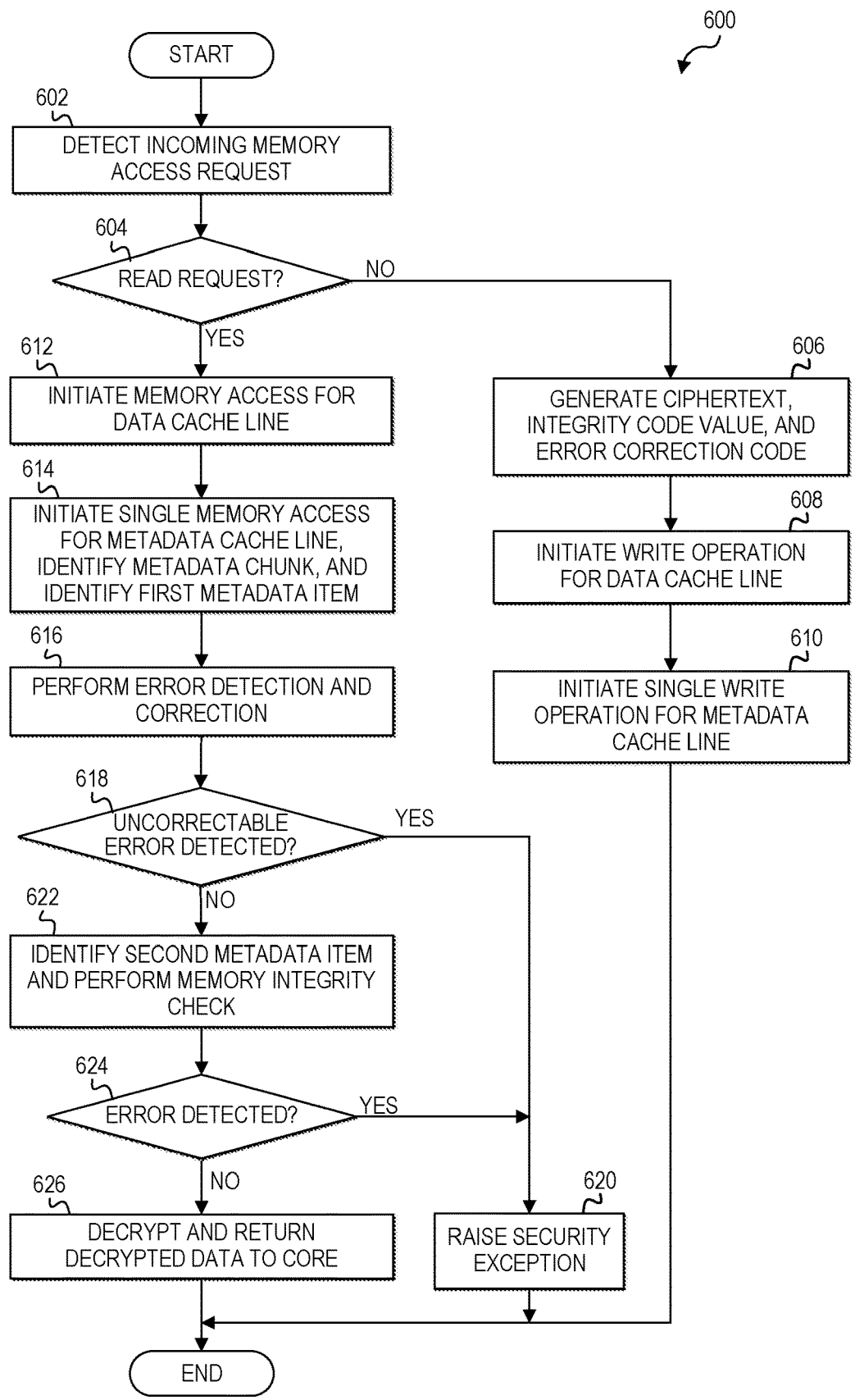
FIG. 6 is a simplified flowchart of further potential operations associated with the computer system providing improved efficiency for metadata usage in memory protection checks according to at least one embodiment.

Turning to FIG. 6, a flow chart illustrates a flow 600 of possible operations for improving efficiency of metadata usage in memory integrity verification and error detection and correction, in accordance with at least one embodiment herein. In FIG. 6, flow 600 may be associated with one or more sets of operations. A computing system (e.g., computing system 100) may comprise means such as one or more processors (e.g., 110), for performing the operations. In one example, at least some operations shown in flow 600 may be performed by memory optimization engine 122 and/or address mapping logic 124 of memory controller 120, and memory protection checks 102(1)-102(M).

At 602, an incoming memory access request is detected. At 604, a determination is made as to whether the memory access request is a read request. If the memory access request is not a read request (e.g., if it is a write request), then at 606, the memory protection operations may generate ciphertext of the data, an ICV of the data, and error correction codes for the data if any. The ciphertext and ICV may be generated as previously described herein.

At 608, a write operation can be initiated to write a data cache line to memory, which includes the ciphertext generated from the data. At 610, a single write operation can be initiated to write a metadata cache line to memory that contains the metadata generated at 606 (e.g., ICV, ECC) to enable memory integrity checks and error detection and correction. In at least one embodiment, this single write operation can cause the ICV and the ECCs to be stored consecutively in the metadata cache line in memory. Thus, when a subsequent read operation is performed on the data in the data cache line, memory integrity verification and ECC checks can be performed on that data using the consecutively stored metadata items. Flow may end after the metadata cache line is written to memory.

At 604, if it is determined that the memory access request is a read request, then at 612, memory access for the data cache line can be initiated. At 614, memory access is initiated for the metadata cache line that contains metadata items to be used for memory integrity verification and error detection and correction of data in the data cache line. Initiating a memory access for the metadata cache line includes identifying the metadata cache line to be accessed. In one example, a determination may be made as to which metadata cache line is mapped to the data cache line, because any given data cache line is mapped to only a single metadata cache line in a one-to-one mapping. It should be noted, however, that in at least one embodiment, other data cache lines may also be mapped to the same metadata cache line. Thus, a metadata cache line may be mapped to data cache lines in a one-to-many mapping.

Also at 614, a metadata chunk that is in the metadata cache line and contains metadata items for the data cache line is identified. In one example, the address of the data cache line can be used to determine an index for the metadata chunk that contains the metadata items for the data cache line. Further at 614, a first metadata item in the identified metadata chunk of the metadata cache line is identified. The first metadata item contains a value (e.g., ECC bits) to be used in an error detection and correction check of the data cache line.

At 616, once the appropriate metadata item has been identified, error detection and correction are performed for the data cache line using the value in the identified metadata item of the identified metadata chunk in the metadata cache line. In particular, if any error codes are present in the metadata item, then correction may be attempted in the data cache line. For example, a bit flip error may be corrected by reversing the bit flip in the data cache line (e.g., if the bit is 0 then it is flipped back to 1, if the bit is 1 then it is flipped back to 0).

At 618, a determination is made as to whether an uncorrectable error has been detected based on the error detection and correction check. For example, an ECC error may be uncorrectable if an attempt to correct the error is made but fails. If the error is uncorrectable, then at 620, a security exception can be raised. In at least one embodiment, security exception handling can be triggered and any suitable action may be taken (e.g., alert sent to user/monitor, error logged, processing halted, etc.).

At 618, if no error is detected or if an error is detected and corrected, then at 622, a second metadata item in the identified metadata chunk of the metadata cache line is identified. The second metadata item contains a value (e.g., a MAC) to be used in memory integrity verification. Once the second metadata item has been identified, memory integrity verification is performed for the data cache line using the value in the identified second metadata item. The second metadata item may contain an integrity code value (ICV), such as a message authentication code (e.g., MAC/HMAC/GMAC) that can be compared to a message authentication code (e.g., MAC/HMAC/GMAC) that is generated over the data (or ciphertext) from the data cache line. If the two ICVs match, then memory integrity is verified.

At 624, if an error is detected (e.g., the two ICVs do not match), then at 620, a security exception can be raised. In at least one embodiment, security exception handling can be triggered and any suitable action may be taken (e.g., alert sent to user/monitor, error logged, processing halted, etc.).

At 624, if no error is detected (e.g., the two ICVs match), then at 626, the data can be decrypted and returned to the processing core to satisfy the memory access request. It should be noted that, flow 600 assumes that memory is encrypted when used in conjunction with memory integrity, but this is not a requirement. In some implementations, data integrity may be required in a system, whereas confidentiality may not be needed. In this scenario, the data may not be encrypted in memory. Moreover, in some implementations, the memory integrity metadata and ECC metadata may be cached to amortize the performance overheads.

As shown in flow 600, for a read access, a maximum of one additional cache line is fetched to retrieve the metadata for both memory protection checks (i.e., memory integrity and ECC). Similarly, for a write access, a maximum of one additional write operation is performed to write metadata items to memory for the memory protection checks to use.

In this example, two metadata usages (i.e., memory integrity and ECC) require metadata and hence, the bandwidth required for supporting the two usages is two times less than an implementation in which metadata for each usage is stored separately. Moreover, the bandwidth savings scale with the number of usages. As an example, in an implementation using unified metadata with three memory protection checks, the bandwidth required for supporting the usages is three times less than an implementation in which the metadata for each usage is stored separately.

Figure 7:
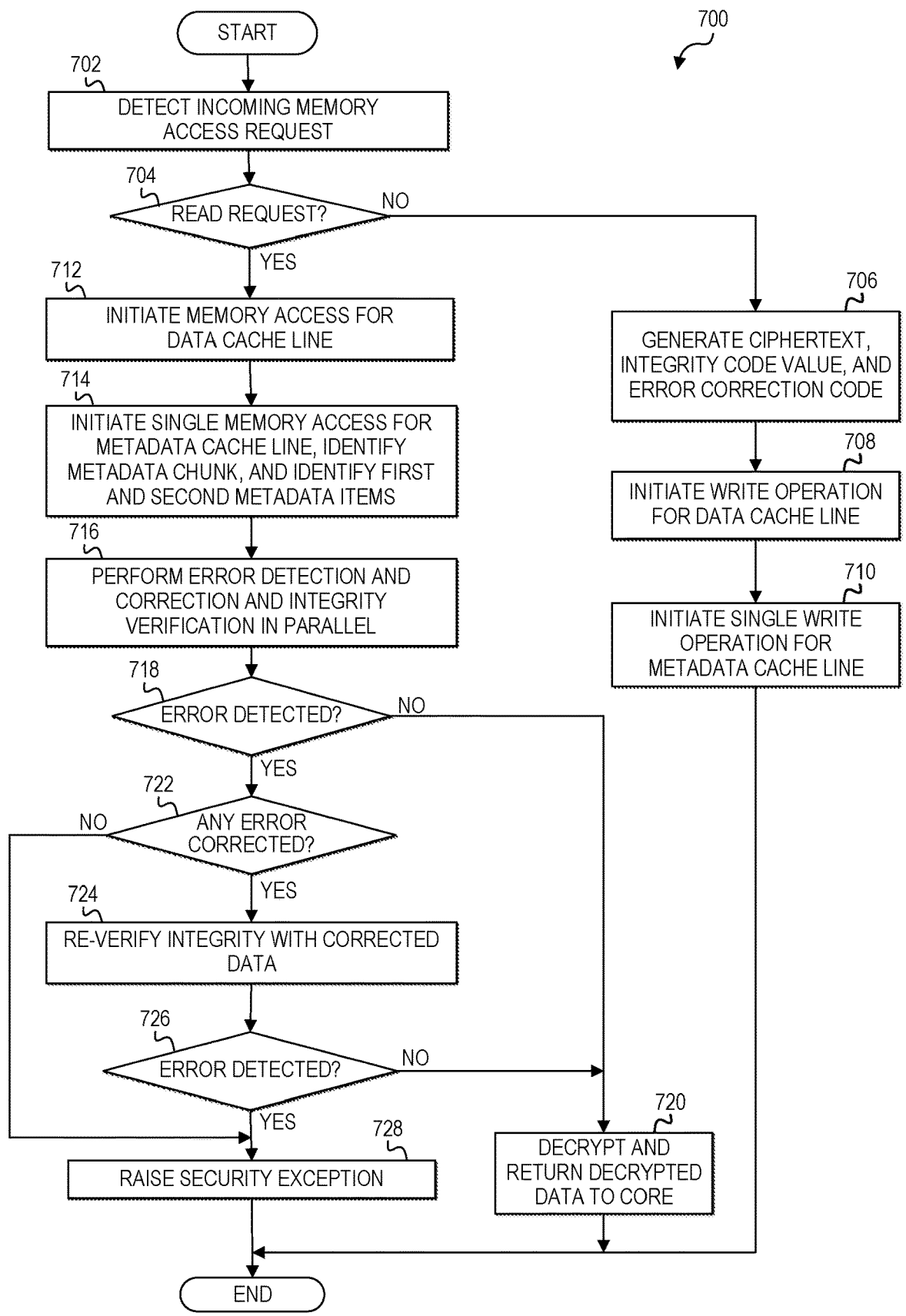
FIG. 7 is a simplified flowchart of yet further potential operations associated with the computer system providing improved efficiency for metadata usage in memory protection checks according to at least one embodiment.

Turning to FIG. 7, a flow chart illustrates a flow 700 of possible operations for improving efficiency of metadata usage in memory integrity verification and error detection and correction, using substantially parallel operations for the memory protection checks in accordance with at least one embodiment herein. In FIG. 7, flow 700 may be associated with one or more sets of operations. A computing system (e.g., computing system 100) may comprise means such as one or more processors (e.g., 110), for performing the operations. In one example, at least some operations shown in flow 700 may be performed by memory optimization engine 122 and/or address mapping logic 124 of memory controller 120 and memory protection checks 102(1)-102(M).

At 702, an incoming memory access request is detected. At 704, a determination is made as to whether the memory access request is a read request. If the memory access request is not a read request (e.g., if it is a write request), then at 706, the memory protection operations may generate ciphertext of the data, an ICV of the data, and error correction codes for the data if any. Ciphertext is generated by encrypting the data to be written to memory using any suitable form of encryption. The ciphertext and ICV may be generated as previously described herein.

At 708, a write operation can be initiated to write a data cache line to memory, which includes the ciphertext generated from the data. At 710, a single write operation can be initiated to write a metadata cache line to memory that contains the metadata generated at 706 (e.g., ICV, ECC) to enable memory integrity checks and error detection and correction. Flow may end after the metadata cache line is written to memory. In at least one embodiment, this single write operation can cause the ICV and the ECCs to be stored consecutively in the metadata cache line in memory. Thus, when a subsequent read operation is performed on the data in the data cache line, memory integrity verification and ECC checks can be performed on that data using the consecutively stored metadata items. Flow may end after the metadata cache line is written to memory.

At 704, if it is determined that the memory access request is a read request, then at 712, memory access for the data cache line can be initiated. At 714, memory access is initiated for the metadata cache line that contains metadata items to be used for memory integrity verification and error detection and correction of data in the data cache line. Initiating a memory access for the metadata cache line includes identifying the metadata cache line to be accessed. In at least one embodiment, the data cache line is mapped to the metadata cache line. In one example, a determination may be made as to which metadata cache line is mapped to the data cache line, because any given data cache line is mapped to only a single metadata cache line in a one-to-one mapping. It should be noted, however, that in at least one embodiment, other data cache lines may also be mapped to the same metadata cache line. Thus, a metadata cache line may be mapped to data cache lines in a one-to-many mapping.

Also at 714, a metadata chunk that is in the metadata cache line and contains metadata items for the data cache line is identified. In one example, the address of the data cache line can be used to determine an index for the metadata chunk containing the metadata items for the data cache line. Further at 714, first and second metadata items in the identified metadata chunk of the metadata cache line are identified. One metadata item contains a value (e.g., ECC bits) to be used in an error detection and correction check of the data cache line. The other metadata item contains a value (e.g., a MAC) to be used in memory integrity verification of the data cache line.

At 716, once the first and second metadata items in the identified metadata chunk of the metadata cache line are identified, error detection and correction are performed substantially in parallel with memory integrity verification using the values from the identified first and second metadata items, respectively. The memory protection checks may be performed substantially in parallel. In at least one embodiment, the memory protection checks are considered to be performed substantially in parallel if the executions of the memory protection checks at least partially overlap.

At 718, a determination is made as to whether an error was detected. If no errors were detected, then at 720, the data can be decrypted and returned to the processing core to satisfy the memory access request.

If an error is detected at 718, then at 722, a determination is made as to whether the error was corrected. In particular, if an ECC error was detected, then it may be correctable if the error is a bit flip. A bit flip error may be corrected by reversing the bit flip (e.g., if the bit is 0 then it is flipped back to 1, if the bit is 1 then it is flipped back to 0). If the error was not corrected, then at 728, a security exception can be raised. In at least one embodiment, security exception handling can be triggered and any suitable action may be taken (e.g., alert sent to user/monitor, error logged, processing halted, etc.).

At 722, if a determination is made that the error was corrected, then at 724, memory integrity may be re-verified. An integrity code value, such as a MAC, may be regenerated over the data (or ciphertext) from the data cache line and compared to the ICV from the metadata item. If the two ICVs match, then memory integrity is verified.

At 726, if an error is detected (e.g., the two ICVs do not match), then at 728, a security exception can be raised. In at least one embodiment, security exception handling can be triggered and any suitable action may be taken (e.g., alert sent to user/monitor, error logged, processing halted, etc.).

At 726, if no error is detected (e.g., the two ICVs match), then at 720, the data can be decrypted and returned to the processing core to satisfy the memory access request. It should be noted that, flow 700 assumes that memory is encrypted when used in conjunction with memory integrity, but this is not a requirement. In some implementations, data integrity may be required in a system, whereas confidentiality may not be needed. In this scenario, the data may not be encrypted in memory. Moreover, in some implementations, the memory integrity and ECC metadata may be cached to amortize the performance overheads.

Flow 700 optimizes the multiple metadata usages by parallelizing the memory protection checks. In this example, error detection and correction and memory integrity verification are performed in parallel. Considering that errors are typically uncommon, in most scenarios, data read from memory will be error free and hence, the parallel integrity verification of data is not unnecessary. Furthermore, parallelizing the operations can reduce latency that may occur when operations are serialized. If the ECC check fails and a bit flip is corrected (e.g., soft error), then the hardware logic can re-verify the MAC with the corrected data in order not to signal false integrity failures. While a failed ECC check may result in some additional power consumption, low error rates are likely to make this rare. Thus, any additional power consumption should have a negligible impact on overall power consumption.

Figure 8:
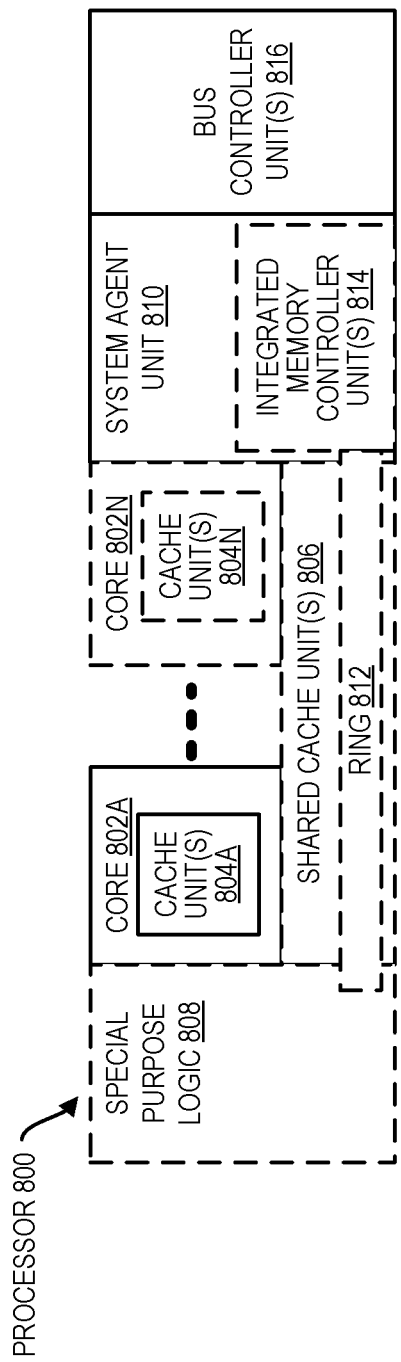
FIG. 8 is a block diagram of a processor that may have more than one core, may have an integrated memory controller, and may have integrated graphics according to at least one embodiment.

FIG. 8 is a block diagram of a processor 800 that may have more than one core, may have an integrated memory controller, and may have integrated graphics according to embodiments of the present disclosure. The solid lined boxes in FIG. 8 illustrate a processor 800 with a single core 802A, a system agent unit 810, a set of one or more bus controller units 816, while the optional addition of the dashed lined boxes illustrates an alternative processor 800 with multiple cores 802A-N, a set of one or more integrated memory controller unit(s) 814 in the system agent unit 810, and special purpose logic 808.

Thus, different implementations of the processor 800 may include: 1) a CPU with the special purpose logic 808 being integrated graphics and/or scientific (throughput) logic (which may include one or more cores), and the cores 802A-N being one or more general purpose cores (e.g., general purpose in-order cores, general purpose out-of-order cores, a combination of the two); 2) a coprocessor with the cores 802A-N being a large number of special purpose cores intended primarily for graphics and/or scientific (throughput); and 3) a coprocessor with the cores 802A-N being a large number of general purpose in-order cores. Thus, the processor 800 may be a general-purpose processor, coprocessor, or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 800 may be a part of and/or may be implemented on one or more substrates using any of a number of process technologies, such as, for example, BiCMOS, CMOS, or NMOS.

The memory hierarchy includes one or more levels of cache within the cores, a set of one or more shared cache units 806, and external memory (not shown) coupled to the set of integrated memory controller units 814. The set of shared cache units 806 may include one or more mid-level caches, such as level 2 (L2), level 3 (L3), level 4 (L4), or other levels of cache, a last level cache (LLC), and/or combinations thereof. While in one embodiment a ring based interconnect unit 812 interconnects the special purpose logic 808 (e.g., integrated graphics logic), the set of shared cache units 806, and the system agent unit 810/integrated memory controller unit(s) 814, alternative embodiments may use any number of well-known techniques for interconnecting such units. In at least one embodiment, integrated memory controller unit 814 may include a memory encryption/decryption capabilities such as MKTME. In at least one embodiment, coherency is maintained between one or more cache units 804A-N and cores 802A-N. This cache coherency may be a memory protection check that depends upon storing and retrieving metadata in accordance with one or more embodiments described herein.

In some embodiments, one or more of the cores 802A-N are capable of multi-threading. The system agent unit 810 includes those components coordinating and operating cores 802A-N. The system agent unit 810 may include for example a power control unit (PCU) and a display unit. The PCU may be or include logic and components needed for regulating the power state of the cores 802A-N and the special purpose logic 808, such as integrated graphics logic. The display unit is for driving one or more externally connected displays.

The cores 802A-N may be homogenous or heterogeneous in terms of architecture instruction set; that is, two or more of the cores 802A-N may be capable of executing the same instruction set, while others may be capable of executing only a subset of that instruction set or a different instruction set.

Figure 9:
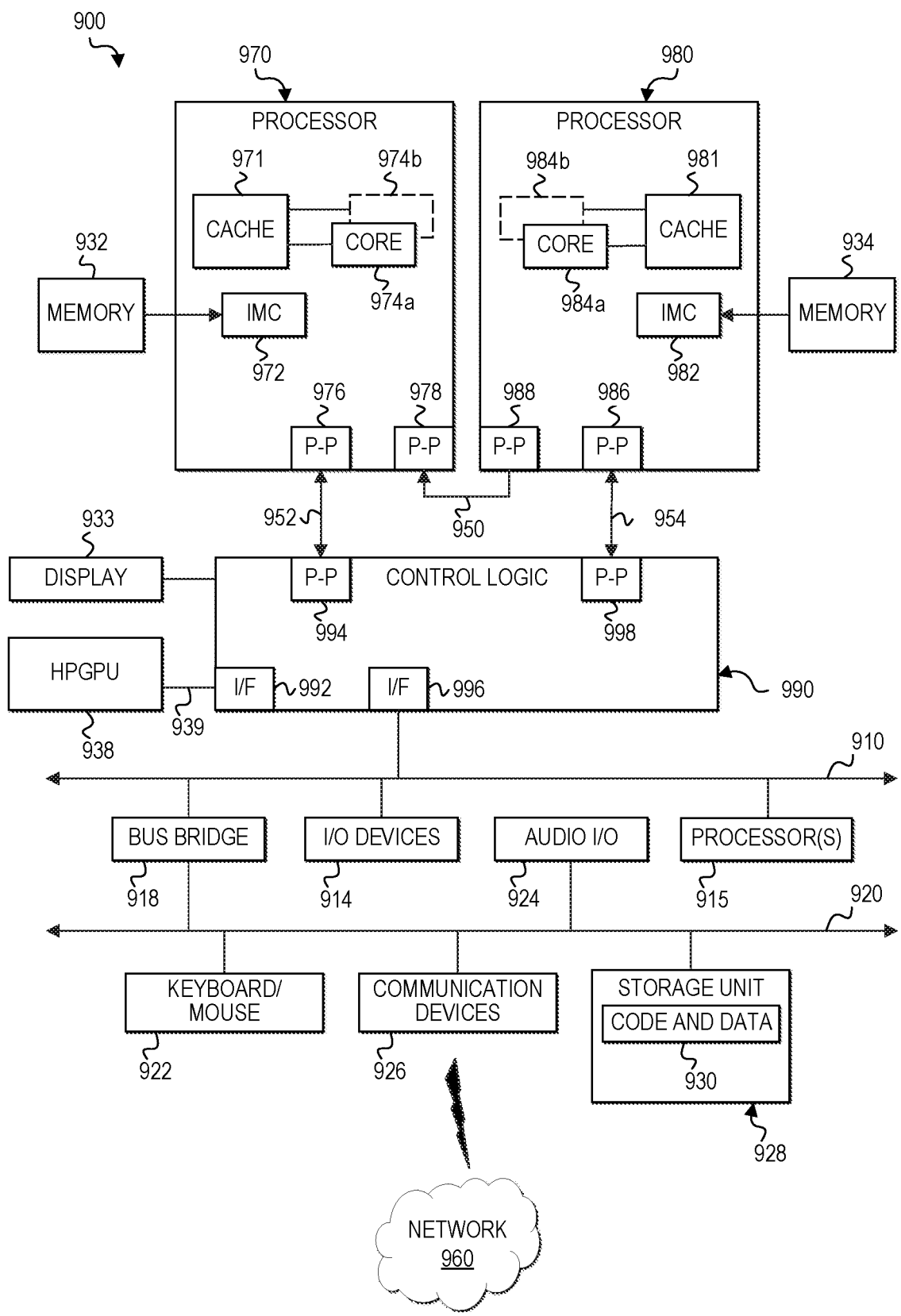
FIG. 9 is a block diagram of an example computing system that is arranged in a point-to-point (PtP) configuration according to at least one embodiment.

FIG. 9 illustrates one possible example of a computing system 900 that is arranged in a point-to-point (PtP) configuration according to an embodiment. In particular, FIG. 9 shows a system where processors, memory, and input/output devices are interconnected by a number of point-to-point interfaces. In at least one embodiment, computing system 100, shown and described herein, may be configured in the same or similar manner as exemplary computing system 900.

Processors 970 and 980 may each include a cache 971 and 981 used by their respective core or cores 974a-974b and 984a-984b. A shared cache (not shown) may be included in either processor or outside of both processors, yet connected with the processors via P-P interconnect, such that either or both processors' local cache information may be stored in the shared cache in certain scenarios (e.g., if a processor is placed into a low power mode).

Processors 970 and 980 may also include integrated memory controller (IMC) units 972 and 982, respectively. IMCs 972 and 982 couple the processors to respective memories, namely a memory 932 and a memory 934, which may be portions of main memory locally attached to the respective processors. In alternative embodiments, memory controller logic 972 and 982 may be discrete logic separate from processors 970 and 980. Memory elements 932 and/or 934 may store various data to be used by processors 970 and 980 in achieving operations associated with providing improved efficiency for metadata usages, as outlined herein.

Processors 970 and 980 may be any type of processor, such as those discussed with reference to processor 800 of FIG. 8, and processor 110 of FIG. 1, for example. Processors 970 and 980 may exchange data via a point-to-point (PtP) interface 950 using point-to-point interface circuits 978 and 988, respectively. Processors 970 and 980 may each exchange data with a control logic 990 via individual point-to-point interfaces 952 and 954 using point-to-point interface circuits 976, 986, 994, and 998. As shown herein, control logic is separated from processing elements 970 and 980. However, in an embodiment, control logic 990 is integrated on the same chip as processing elements 970 and 980. Also, control logic 990 may be partitioned differently with fewer or more integrated circuits. Additionally, control logic 990 may also exchange data with a high-performance graphics processing unit (HPGPU) 938 via a high-performance graphics interface 939, using an interface circuit 992, which could be a PtP interface circuit. In alternative embodiments, any or all of the PtP links illustrated in FIG. 9 could be implemented as a multi-drop bus rather than a PtP link. Control logic 990 may also communicate with a display 933 for displaying data that is viewable by a human user.

Control logic 990 may be in communication with a bus 910 via an interface circuit 996. Bus 910 may have one or more devices that communicate over it, such as a bus bridge 918, I/O devices 914, and one or more other processors 915. Via a bus 920, bus bridge 918 may be in communication with other devices such as a keyboard/mouse 922 (or other input devices such as a touch screen, trackball, joystick, etc.), communication devices 926 (such as modems, network interface devices, or other types of communication devices that may communicate through a computer network 960), audio I/O devices 924, and/or a data storage unit 928. Data storage unit 928 may store code and data 930, and the code may be executed by processors 970 and/or 980. In alternative embodiments, any portions of the bus architectures could be implemented with one or more PtP links.

The computing system depicted in FIG. 9 is a schematic illustration of an embodiment that may be utilized to implement various embodiments discussed herein. It will be appreciated that various components of the system depicted in FIG. 9 may be combined in a system-on-a-chip (SoC) architecture or in any other suitable configuration capable of providing improved efficiency for metadata usages, according to the various embodiments provided herein.

Figure 10:
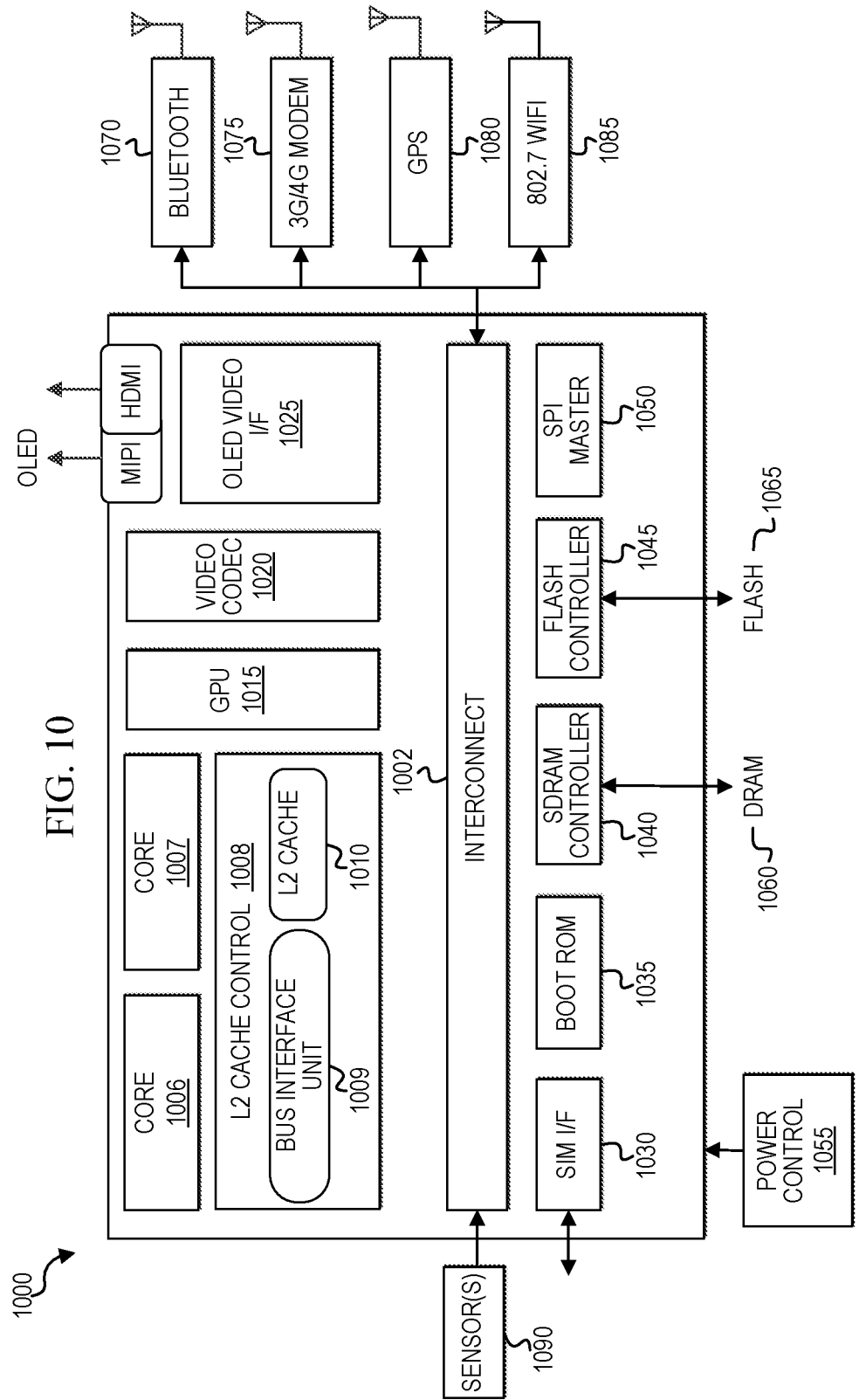
FIG. 10 is a simplified block diagram associated with an example ARM ecosystem system on chip (SOC) according to at least one embodiment.

Turning to FIG. 10, FIG. 10 is a simplified block diagram associated with an example ARM ecosystem SOC 1000 of the present disclosure. At least one example implementation of the present disclosure can include providing improved efficiency for metadata usage in memory protection checks discussed herein and an ARM component. For example, in at least some embodiments, computing system 100, shown and described herein, could be configured in the same or similar manner ARM ecosystem SOC 1000. Further, the architecture can be part of any type of tablet, smartphone (inclusive of Android™ phones, iPhones™), iPad™, Google Nexus™, Microsoft Surface™, personal computer, server, video processing components, laptop computer (inclusive of any type of notebook), Ultrabook™ system, any type of touch-enabled input device, etc.

In this example of FIG. 10, ARM ecosystem SOC 1000 may include multiple cores 1006-1007, an L2 cache control 1008, a bus interface unit 1009, an L2 cache 1010, a graphics processing unit (GPU) 1015, an interconnect 1002, a video codec 1020, and an organic light emitting diode (OLED) I/F 1025, which may be associated with mobile industry processor interface (MIPI)/high-definition multimedia interface (HDMI) links that couple to an OLED display.

ARM ecosystem SOC 1000 may also include a subscriber identity module (SIM) I/F 1030, a boot read-only memory (ROM) 1035, a synchronous dynamic random access memory (SDRAM) controller 1040, a flash controller 1045, a serial peripheral interface (SPI) master 1050, a suitable power control 1055, a dynamic RAM (DRAM) 1060, flash 1065, and one or more sensors 1090. In at least one embodiment, memory optimization engine 122 and address mapping logic 124, both of which were shown and described in FIG. 1, may be provisioned on the path to DRAM 1060. In addition, one or more example embodiments include one or more communication capabilities, interfaces, and features such as instances of Bluetooth™ 1070, a 3G modem 1075, a global positioning system (GPS) 1080, and an 802.11 Wi-Fi 1085.

In operation, the example of FIG. 10 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe® Flash® Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

With regard to this specification generally, unless expressly stated to the contrary, use of the phrase 'at least one of' refers to any combination of the named elements, conditions, or activities. For example, 'at least one of X, Y, and Z' is intended to mean any of the following: 1) at least one X, but not Y and not Z; 2) at least one Y, but not X and not Z; 3) at least one Z, but not X and not Y; 4) at least one X and at least one Y, but not Z; 5) at least one X and at least one Z, but not Y; 6) at least one Y and at least one Z, but not X; or 7) at least one X, at least one Y, and at least one Z. Additionally, unless expressly stated to the contrary, the terms 'first', 'second', 'third', etc., are intended to distinguish the particular items (e.g., element, condition, module, activity, operation, claim element, etc.) they modify, but are not intended to indicate any type of order, rank, importance, temporal sequence, or hierarchy of the modified noun. For example, 'first X' and 'second X' are intended to designate two separate X elements that are not necessarily limited by any order, rank, importance, temporal sequence, or hierarchy of the two elements.

Regarding possible internal structures associated with computing system 100, a processor is connected to a memory element, which represents one or more types of memory including volatile and/or nonvolatile memory elements for storing data and information, including instructions, logic, and/or code, to be used in the operations outlined herein. Computing system 100 may keep data and information in any suitable memory element (e.g., static random access memory (SRAM), dynamic random access memory (DRAM), read-only memory (ROM), programmable ROM (PROM), erasable PROM (EPROM), electrically EPROM (EEPROM), a disk drive, a floppy disk, a compact disk ROM (CD-ROM), a digital versatile disk (DVD), flash memory, a magneto-optical disk, an application specific integrated circuit (ASIC), or other types of nonvolatile machine-readable media that are capable of storing data and information), software, hardware, firmware, or in any other suitable component, device, element, or object where appropriate and based on particular needs. Any of the memory items discussed herein (e.g., memory elements 130, 804A-804N, 806, 932, 934, 928, 971, 981, 1010, 1035, 1060, etc.) should be construed as being encompassed within the broad term 'memory element.' Moreover, the information being used, tracked, sent, or received in computing system 100 could be provided in any storage structure including, but not limited to, a repository, database, register, queue, table, cache, etc., all of which could be referenced at any suitable timeframe. Any such storage structures may also be included within the broad term 'memory element' as used herein.

In an example implementation, computing system 100 includes software to achieve (or to foster) providing improved efficiency for metadata usage in memory protection checks, as outlined herein. In some embodiments, these techniques for improving the efficiency of metadata usage may be carried out by hardware and/or firmware, implemented externally to these elements, or included in some other computing system to achieve the intended functionality. These elements may also include software (or reciprocating software) that can coordinate with other computing systems or devices in order to achieve the intended functionality, as outlined herein. In still other embodiments, one or several elements may include any suitable algorithms, hardware, software, components, modules, interfaces, or objects that facilitate the operations thereof. Modules may be suitably combined or partitioned in any appropriate manner, which may be based on particular configuration and/or provisioning needs.

In certain example implementations, the functions outlined herein may be implemented by logic encoded in one or more tangible media (e.g., embedded logic provided in an ASIC, digital signal processor (DSP) instructions, hardware instructions and/or software (potentially inclusive of object code and source code) to be executed by a processor, or other similar machine, etc.), which may be inclusive of non-transitory machine-readable media. In an example, computing system 100 may include one or more processors (e.g., processors 110, 970, 980, 1006, 1007) that are communicatively coupled to memory elements and that can execute logic or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, agents, engines, managers, modules, and machines described herein should be construed as being encompassed within the broad term 'processor.'

The architectures presented herein are provided by way of example only and are intended to be non-exclusive and non-limiting. Furthermore, the various parts disclosed are intended to be logical divisions only and need not necessarily represent physically separate hardware and/or software components. Certain computing systems may provide memory elements in a single physical memory device, and in other cases, memory elements may be functionally distributed across many physical devices. In the case of virtual machine managers or hypervisors, all or part of a function may be provided in the form of software or firmware running over a virtualization layer to provide the disclosed logical function.

Note that with the examples provided herein, embodiments may be described in terms of a single computing systems (e.g., computing system 100). However, this has been done for purposes of clarity and example only. In certain cases, it may be easier to describe one or more of the functionalities of a given set of flows by only referencing a single computing system. Moreover, the system for improving efficiency of metadata usage in memory protection checks is readily scalable and can be implemented across a large number of components (e.g., multiple computing systems), as well as more complicated/sophisticated arrangements and configurations. Accordingly, the examples provided should not limit the scope or inhibit the broad teachings of the computing system as potentially applied to a myriad of other architectures.

It is also important to note that the operations in the preceding flowcharts and diagrams illustrating interactions (e.g., FIGS. 5-7), illustrate only some of the possible activities that may be executed by, or within, computing system 100 using the approaches disclosed herein for improving the efficiency of metadata usage in memory protection checks. Some of these operations may be deleted or removed where appropriate, or these operations may be modified or changed considerably without departing from the scope of the present disclosure. In addition, the timing of these operations may be altered considerably. For example, the timing and/or sequence of certain operations may be changed relative to other operations to be performed before, after, or in parallel to the other operations, or based on any suitable combination thereof. The preceding operational flows have been offered for purposes of example and discussion. Substantial flexibility is provided by embodiments described herein in that any suitable arrangements, chronologies, configurations, and timing mechanisms may be provided without departing from the teachings of the present disclosure.

Other Notes and Examples

The following examples pertain to embodiments in accordance with this specification. The system, apparatus, method, and machine readable storage medium embodiments can include one or a combination of the following examples:

Example A1 provides an apparatus or a system comprising a memory controller coupled to a processor and a memory, where the memory controller is to: detect a read request for data in the memory; initiate a first access to the memory for a data cache line containing the data; and initiate a second access to the memory for a metadata cache line mapped to the data cache line, where the metadata cache line contains two or more metadata items for two or more memory protection checks to be performed based on the data cache line.

In Example A2, the subject matter of Example A1 can optionally include where the two or more memory protection checks include two or more of an error detection check using an error correcting code (ECC), a memory integrity verification, and a memory tagging validation.

In Example A3, the subject matter of any one of Examples A1-A2 can optionally include where the memory controller is further to: perform the two or more memory protection checks using, respectively, the two or more metadata items from the metadata cache line; and trigger security exception handling based on determining that at least one of the two or more memory protection checks to be performed based on the data cache line fails.

In Example A4, the subject matter of any one of Examples A1-A3 can optionally include where the memory controller is further to: perform a first memory protection check using a first metadata item of the two or more metadata items; and detect an error based on an error correction code.

In Example A5, the subject matter of Example A4 can optionally include where the memory controller is further to determine that the error is uncorrectable, and trigger security exception handling based on determining that the error is uncorrectable.

In Example A6, the subject matter of Example A4 can optionally include where the memory controller is further to determine that the error is correctable, correct the error, and perform a second memory protection check using a second metadata item of the two or more metadata items.

In Example A7, the subject matter of any one of Examples A1-A6 can optionally include where the two or more memory protection checks are to be performed substantially in parallel.

In Example A8, the subject matter of any one of Examples A1-A7 can optionally include where each data cache line in the memory is mapped to a single metadata cache line.

In Example A9, the subject matter of any one of Examples A1-A8 can optionally include where the metadata cache line is mapped to a second data cache line, and where the metadata cache line contains two or more other metadata items for the two or more memory protection checks to be performed based on the second data cache line.

In Example A10, the subject matter of any one of Examples A1-A9 can optionally include where the memory controller is further to identify an index to a metadata chunk in the metadata cache line, where the metadata chunk contains the two or more metadata items.

In Example A11, the subject matter of any one of Examples A1-A10 can optionally include where the memory controller is further to, prior to detecting the read request: detect a write request for the data; generate the two or more metadata items based, at least in part, on the data; initiate a first write operation to store the data in the data cache line in the memory; and initiate a second write operation to store the two or more metadata items consecutively in the metadata cache line in the memory.

In Example A12, the subject matter of any one of Examples A1-A11 can optionally include where the metadata cache line contains one or more other metadata items for one or more performance optimizations to be performed based on the data cache line.

Example M1 provides a method comprising detecting a read request for data in a memory; initiating a first access to the memory for a data cache line containing the data; and initiating a second access to the memory for a metadata cache line mapped to the data cache line, where the metadata cache line contains two or more metadata items for two or more memory protection checks to be performed based on the data cache line.

In Example M2, the subject matter of Example M1 can optionally include where the two or more memory protection checks include two or more of an error detection check using an error correcting code (ECC), a memory integrity verification, and a memory tagging validation.

In Example M3, the subject matter of any one of Examples M1-M2 can optionally include performing the two or more memory protection checks using, respectively, the two or more metadata items from the metadata cache line, and triggering security exception handling based on determining that at least one of the two or more memory protection checks to be performed based on the data cache line fails.

In Example M4, the subject matter of any one of Examples M1-M3 can optionally include performing a first memory protection check using a first metadata item of the two or more metadata items and detecting an error based on an error correction code.

In Example M5, the subject matter of Example M4 can optionally include determining that the error is uncorrectable, and triggering security exception handling based on determining that the error is uncorrectable.

In Example M6, the subject matter of Example M4 can optionally include determining that the error is correctable, correcting the error, and performing a second memory protection check using a second metadata item of the two or more metadata items.

In Example M7, the subject matter of any one of Examples M1-M6 can optionally include where the two or more memory protection checks are performed substantially in parallel.

In Example M8, the subject matter of any one of Examples M1-M7 can optionally include where each data cache line in the memory is mapped to a single metadata cache line.

In Example M9, the subject matter of any one of Examples M1-M8 can optionally include where the metadata cache line is mapped to a second data cache line, and where the metadata cache line contains two or more other metadata items for the two or more memory protection checks to be performed based on the second data cache line.

In Example M10, the subject matter of any one of Examples M1-M9 can optionally include identifying an index to a metadata chunk in the metadata cache line, where the metadata chunk contains the two or more metadata items.

In Example M11, the subject matter of any one of Examples M1-M10 can optionally include, prior to detecting the read request, detecting a write request for the data, generating the two or more metadata items based, at least in part, on the data, initiating a first write operation to store the data in the data cache line in the memory, and initiating a second write operation to store the two or more metadata items consecutively in the metadata cache line in the memory.

In Example M12, the subject matter of any one of Examples M1-M11 can optionally include where the metadata cache line contains one or more other metadata items for one or more performance optimizations to be performed based on the data cache line.

Example P1 provides an apparatus or a system comprising a memory controller coupled to a processor and a memory, where the memory controller is to: detect a write request for data to be written to the memory; generate two or more metadata items for two or more memory protection checks to be performed on the data; initiate a first write operation to store the data to a data cache line in the memory; and initiate a second write operation to store the two or more metadata items to a single metadata cache line in the memory.

In Example P2, the subject matter of Example P1 can optionally include where the two or more memory protection checks include two or more of an error detection check using an error correcting code (ECC), a memory integrity verification, and a memory tagging validation.

In Example P3, the subject matter of any one of Examples P1-P2 can optionally include where each data cache line in the memory is mapped to one metadata cache line.

In Example P4, the subject matter of any one of Examples P1-P3 can optionally include where the memory controller is further to identify an index to a metadata chunk in the single metadata cache line, where the metadata chunk contains the two or more metadata items.

In Example P5, the subject matter of any one of Examples P1-P4 can optionally include where the memory controller is further to, subsequent to detecting the write request: detect a read request for the data in the data cache line in the memory; initiate a first access to the memory for the data cache line containing the data; and initiate a second access to the memory for the single metadata cache line mapped to the data cache line.

In Example P6, the subject matter of any one of Examples P1-P5 can optionally include where the memory controller is further to, generate one or more metadata items for one or more performance optimizations to be performed based on the data cache line, where the second write operation is further to store the one or more metadata items for the one or more performance optimizations to the single metadata cache line in the memory.

Example E1 provides a method comprising detecting a write request for data to be written to the memory, generating two or more metadata items for two or more memory protection checks to be performed on the data, initiating a first write operation to store the data to a data cache line in the memory, and initiating a second write operation to store the two or more metadata items to a single metadata cache line in the memory.

In Example E2, the subject matter of Example E1 can optionally include where the two or more memory protection checks include two or more of an error detection check using an error correcting code (ECC), a memory integrity verification, and a memory tagging validation.

In Example E3, the subject matter of any one of Examples E1-E2 can optionally include where each data cache line in the memory is mapped to one metadata cache line.

In Example E4, the subject matter of any one of Examples E1-E3 can optionally include identifying an index to a metadata chunk in the single metadata cache line, where the metadata chunk contains the two or more metadata items.

In Example E5, the subject matter of any one of Examples E1-E4 can optionally include, subsequent to detecting the write request, detecting a read request for the data in the data cache line in the memory, initiating a first access to the memory for the data cache line containing the data, and initiating a second access to the memory for the single metadata cache line mapped to the data cache line.

In Example E6, the subject matter of any one of Examples E1-E5 can optionally include generating one or more metadata items for one or more performance optimizations to be performed based on the data cache line, where the second write operation stores the one or more metadata items for the one or more performance optimizations to the single metadata cache line in the memory.

An Example Y1 provides an apparatus, the apparatus comprising means for performing the method of any one of the Examples M1-M12 or E1-E6.

In Example Y2, the subject matter of Example Y1 can optionally include that the means for performing the method comprises at least one processor and at least one memory element.

In Example Y3, the subject matter of Example Y2 can optionally where the at least one memory element comprises machine readable instructions that when executed, cause the apparatus to perform the method of any one of Examples M1-M12 or E1-E6.

In Example Y4, the subject matter of any one of Examples Y1-Y3 can optionally include that the apparatus is one of a computing system or a system-on-a-chip.

An Example X1 provides at least one machine readable storage medium comprising instructions, where the instructions when executed realize an apparatus or implement a method as provided in any one of Examples A1-A12, M1-M12, P1-P6, or E1-E6.

What is claimed is:

1. An apparatus, the apparatus comprising:
a memory controller coupled to a processor and a memory, wherein the memory controller is to:
 detect a read request for first data in the memory;
 initiate a first access to a first address in the memory for a first data cache line containing the first data;
 initiate a second access to a second address in the memory for a metadata cache line mapped to the first data cache line;
 identify a first metadata chunk in the metadata cache line, wherein the first metadata chunk in the metadata cache line contains two or more metadata items for two or more memory protection checks to be performed based on the first data cache line;
 initiate a third access to a third address in the memory for a second data cache line containing second data; and
 identify a second metadata chunk in the metadata cache line, wherein the second metadata chunk in the metadata cache line contains two or more other metadata items for the two or more memory protection checks to be performed based on the second data cache line.

2. The apparatus of claim 1, wherein the two or more memory protection checks include two or more of an error detection check using an error correcting code (ECC), a memory integrity verification, and a memory tagging validation.

3. The apparatus of claim 1, wherein the memory controller is further to:
perform the two or more memory protection checks on the first data cache line using, respectively, the two or more metadata items from the metadata cache line; and
trigger security exception handling based on determining that at least one of the two or more memory protection checks fails when performed based on the first data cache line.

4. The apparatus of claim 1, wherein the memory controller is further to:
perform a first memory protection check using a first metadata item of the two or more metadata items; and
detect an error based on an error correction code.

5. The apparatus of claim 4, wherein the memory controller is further to:
   determine that the error is uncorrectable; and
   trigger security exception handling based on determining that the error is uncorrectable.

6. The apparatus of claim 4, wherein the memory controller is further to:
   determine that the error is correctable;
   correct the error; and
   perform a second memory protection check using a second metadata item of the two or more metadata items.

7. The apparatus of claim 1, wherein the two or more memory protection checks are to be performed based on the first data cache line substantially in parallel.

8. The apparatus of claim 1, wherein each data cache line in the memory is mapped to a single metadata cache line.

9. The apparatus of claim 1, wherein the metadata cache line is mapped to the second data cache line.

10. The apparatus of claim 1, wherein the memory controller is further to:
    identify a first index to the first metadata chunk in the metadata cache line, wherein the first index is associated with the first address of the first data cache line; and
    identify a second index to the second metadata chunk in the metadata cache line, wherein the second index is associated with the second address of the second data cache line.

11. The apparatus of claim 1, wherein the memory controller is further to, prior to detecting the read request:
    detect a write request for the first data;
    generate the two or more metadata items based, at least in part, on the first data;
    initiate a first write operation to store the first data in the first data cache line in the memory; and
    initiate a second write operation to store the two or more metadata items consecutively in the metadata cache line in the memory.

12. A method, the method comprising:
    detecting a read request for first data in a memory;
    initiating a first access to a first address in the memory for a first data cache line containing the first data;
    initiating a second access to a second address in the memory for a metadata cache line mapped to the first data cache line;
    identifying a first metadata chunk in the metadata cache line, wherein the first metadata chunk in the metadata cache line contains two or more metadata items for two or more memory protection checks to be performed based on the first data cache line;
    initiating a third access to a third address in the memory for a second data cache line containing second data; and
    identifying a second metadata chunk in the metadata cache line, wherein the second metadata chunk in the metadata cache line contains two or more other metadata items for the two or more memory protection checks to be performed based on the second data cache line.

13. The method of claim 12, wherein the two or more memory protection checks include two or more of an error detection using an error correcting code (ECC), a memory integrity verification, and a memory tagging validation.

14. The method of claim 12, wherein the two or more memory protection checks are performed based on the first data cache line substantially in parallel.

15. The method of claim 12, wherein the metadata cache line is mapped to the second data cache line.

16. The method of claim 12, wherein the method further comprises, prior to the detecting the read request:
    detecting a write request for the first data;
    generating the two or more metadata items based, at least in part, on the first data;
    initiating a first write operation to store the first data in the first data cache line in the memory; and
    initiating a second write operation to store the two or more metadata items consecutively in the metadata cache line in the memory.

17. One or more non-transitory machine readable storage media comprising instructions for execution that when executed by one or more processors, cause the one or more processors to:
    detect a write request for first data to be written to a memory;
    generate two or more metadata items for two or more memory protection checks to be performed on the first data;
    initiate a first write operation to store a first data cache line containing the first data to a first address in the memory; and
    initiate a second write operation to store a single metadata cache line including a first metadata chunk that contains the two or more metadata items for the two or more memory protection checks to be performed based on the first data, wherein the single metadata cache line includes a second metadata chunk that contains two or more other metadata items for the two or more memory protection checks to be performed based on a second data cache line stored at a second address in the memory.

18. The one or more non-transitory machine readable storage claim 17, wherein each data cache line in the memory is mapped to one metadata cache line.

19. The one or more non-transitory machine readable storage claim 17, wherein, when executed by the one or more processors, the instructions for execution cause the one or more processors to:
    identify a first index to the first metadata chunk in the single metadata cache line, wherein the first index is associated with the first address of the first data cache line stored in the memory; and
    identify a second index to the second metadata chunk in the single metadata cache line, wherein the second index is associated with the second address of the second data cache line stored in the memory.

20. The one or more non-transitory machine readable storage claim 17, wherein, when executed by the one or more processors, the instructions for execution cause the one or more processors to, subsequent to detecting the write request:
    detect a read request for the first data at the first address in the memory;
    initiate a first access to the first address in the memory for the first data cache line containing the first data; and
    initiate a second access to the second address in the memory for the single metadata cache line mapped to the first data cache line and the second data cache line.

21. The one or more non-transitory machine readable storage media of claim 17, wherein, when executed by the one or more processors, the instructions for execution cause the one or more processors to: generate a first metadata item of the two or more metadata items for a performance optimization to be performed based on the first data cache line, wherein the second write operation is further to store the first metadata item of the two or more metadata items to the single metadata cache line in the memory.

* * * * *